US012000189B2

(12) United States Patent
Gstrein

(10) Patent No.: US 12,000,189 B2
(45) Date of Patent: Jun. 4, 2024

(54) HINGE ASSEMBLY

(71) Applicant: Julius Blum GmbH, Hoechst (AT)

(72) Inventor: Florian Gstrein, Wolfurt (AT)

(73) Assignee: JULIUS BLUM GMBH, Hoechst (AT)

( * ) Notice: Subject to any disclaimer, the term of this patent is extended or adjusted under 35 U.S.C. 154(b) by 78 days.

(21) Appl. No.: 17/864,806

(22) Filed: Jul. 14, 2022

(65) Prior Publication Data

US 2022/0349229 A1 Nov. 3, 2022

Related U.S. Application Data

(63) Continuation of application No. PCT/AT2021/060014, filed on Jan. 14, 2021.

(30) Foreign Application Priority Data

Jan. 17, 2020 (AT) .............................. A 50032/2020

(51) Int. Cl.
*E05D 7/10* (2006.01)
*E05D 3/02* (2006.01)
(Continued)

(52) U.S. Cl.
CPC ............... *E05D 7/123* (2013.01); *E05D 3/02* (2013.01); *E05D 7/0415* (2013.01); *E05D 5/065* (2013.01);
(Continued)

(58) Field of Classification Search
CPC ........... E05Y 2900/20; E05Y 2900/202; E05Y 2900/204; E05Y 2900/208; E05Y 2201/20;
(Continued)

(56) References Cited

U.S. PATENT DOCUMENTS 4,850,080 A 7/1989 Röck et al.
5,025,530 A * 6/1991 Ferrari .................... E05D 7/125 16/382

(Continued)

FOREIGN PATENT DOCUMENTS

AT 360856 B * 2/1980
AT 383 852 9/1987

(Continued)

OTHER PUBLICATIONS

International Search Report issued Apr. 14, 2021 in International (PCT) Application No. PCT/AT2021/060014.

(Continued)

*Primary Examiner* — Chuck Y Mah
(74) *Attorney, Agent, or Firm* — WENDEROTH, LIND & PONACK, L.L.P.

(57) ABSTRACT

A hinge assembly includes a mounting body to be fixed to a furniture carcass, a furniture hinge having two fitting portions connected to one another via at least one hinge axis, and a locking device for locking one of the fitting portions of the furniture hinge to the mounting body. The locking device includes at least one holding portion having an outer contour, and a locking contour corresponding thereto. The locking contour includes at least one stationary first member and at least one second member configured to be moved, preferably pivotally, relative to the first member. The at least one holding portion is received between the two members of the locking contour in a locked position.

24 Claims, 5 Drawing Sheets

(51) Int. Cl.

| | |
|---|---|
| ***E05D 7/04*** | (2006.01) |
| ***E05D 7/12*** | (2006.01) |
| *E05D 5/06* | (2006.01) |
| *E05F 3/20* | (2006.01) |

(52) U.S. Cl.
CPC ................ *E05D 2007/0492* (2013.01); *E05D 2007/128* (2013.01); *E05F 3/20* (2013.01); *E05Y 2900/20* (2013.01)

(58) Field of Classification Search
CPC ........... E05Y 2201/21; E05Y 2201/261; E05Y 2201/11; E05Y 2201/258; E05Y 2201/46; E05Y 2201/474; E05F 5/006; E05F 5/065; E05F 5/02; E05F 5/027; E05F 5/10; E05D 11/0054; E05D 11/1021; E05D 11/1042; E05D 11/105; E05D 11/1064; E05D 7/04; E05D 7/0407; E05D 7/0415; E05D 7/0423; E05D 7/1083; E05D 7/12; E05D 7/123; E05D 7/125; E05D 3/142; E05D 3/02; E05D 5/065; E05D 2007/0492; E05D 2007/128; E05D 2207/0476; E05D 2207/0484; E05D 2207/1094
See application file for complete search history.

(56) References Cited

U.S. PATENT DOCUMENTS

| | | | | |
|---|---|---|---|---|
| 5,791,016 | A * | 8/1998 | Lenz | E05D 7/125 16/258 |
| 5,819,371 | A * | 10/1998 | Rock | E05D 7/123 16/382 |
| 6,148,479 | A * | 11/2000 | Lin | E05D 7/125 16/236 |
| 6,266,848 | B1 * | 7/2001 | Fraccaro | E05D 7/0407 16/241 |
| 6,675,440 | B1 * | 1/2004 | Lautenschlager | E05D 7/125 16/258 |
| 6,996,877 | B2 | 2/2006 | Booker et al. | |
| 7,178,199 | B2 | 2/2007 | Kashiwaguma | |
| 7,213,300 | B1 * | 5/2007 | Domenig | E05D 7/04 16/236 |
| 7,509,708 | B1 * | 3/2009 | Radke | E05D 7/081 16/245 |
| 9,163,447 | B1 * | 10/2015 | Liang | E05F 5/006 |
| 9,874,049 | B1 * | 1/2018 | McGregor | E05D 5/065 |
| 11,149,481 | B2 | 10/2021 | Tanriverdi | |
| 2004/0163213 | A1 * | 8/2004 | Isele | E05D 7/0407 16/245 |
| 2004/0216272 | A1 | 11/2004 | Booker et al. | |
| 2005/0172451 | A1 | 8/2005 | Kashiwaguma | |
| 2006/0137139 | A1 * | 6/2006 | Wu | E05D 7/0423 16/236 |
| 2014/0359973 | A1 * | 12/2014 | Ng | E05D 7/00 16/225 |
| 2016/0032636 | A1 * | 2/2016 | Dai | E05F 5/006 16/65 |
| 2016/0208533 | A1 * | 7/2016 | Ng | E05F 1/1207 |
| 2017/0254128 | A1 * | 9/2017 | Ng | E05D 3/02 |
| 2018/0087307 | A1 | 3/2018 | Hammerer | |
| 2018/0155974 | A1 * | 6/2018 | Kirenci | E05F 5/02 |
| 2018/0355651 | A1 * | 12/2018 | Liang | E05D 11/00 |
| 2019/0211597 | A1 | 7/2019 | Tanriverdi | |
| 2021/0148147 | A1 | 5/2021 | Capur et al. | |
| 2021/0277698 | A1 * | 9/2021 | Capur | E05F 5/006 |

FOREIGN PATENT DOCUMENTS

| | | | |
|---|---|---|---|
| CN | 205000799 | U * | 1/2016 |
| CN | 105909098 | A * | 8/2016 |
| CN | 107810304 | | 3/2018 |
| DE | 85 30 987.7 | | 4/1987 |
| EP | 0 982 455 | | 3/2000 |
| JP | 62-107183 | | 5/1987 |
| JP | 6-29414 | | 8/1994 |
| JP | 4040355 | | 11/2007 |
| WO | 2018/033221 | | 2/2018 |
| WO | 2020/005174 | | 1/2020 |

OTHER PUBLICATIONS

Search Report issued Jan. 14, 2021 in corresponding Chinese Patent Application No. 202180016224.X.

* cited by examiner

HINGE ASSEMBLY

BACKGROUND OF INVENTION

The present invention relates to a hinge assembly including a mounting body to be fixed to a furniture carcass, in particular to a frame of the furniture carcass, a furniture hinge comprising two fitting portions connected to one another via at least one, in particularly precisely one, hinge axis, and a locking device for, in particular releasably, locking one of the fitting portions of the furniture hinge to the mounting body.

AT 383 852 B discloses a furniture hinge with a hinge arm, the hinge arm being configured to be releasably locked via a locking device to a base plate which is to be fixed to a furniture carcass. This offers the comfortable possibility to pre-mount two or more base plates to the furniture carcass, and to pre-mount two or more furniture hinges to a movable furniture part in a first mounting step. In a subsequent mounting step, the furniture hinges pre-mounted to the furniture part can be fixed, with their hinge arms, to the base plates pre-mounted to the furniture carcass without the use of a tool, and can also be demounted without the use of a tool. The hinge arm is provided with a spring-loaded tensioning lever, and a hook of the spring-loaded tensioning lever, in the locked position, engages below a protrusion of the base plate. By manually lifting the spring-loaded tensioning lever, the locking between the hinge arm and the base plate can be again released.

A drawback of the known locking devices lies in the fact that the locking, upon applying a force to the tensioning lever, is immediately released. This means that the components configured to be locked to one another can abruptly be loosened from one another by an (also unintentional) actuation of the tensioning lever. Therefore, there is the danger of a crash of the movable furniture part. Thereby, it is possible that damages to objects, to persons and also to the movable furniture part itself may occur.

SUMMARY OF THE INVENTION

It is an object of the present invention to propose a hinge assembly of the type mentioned in the introductory part, thereby avoiding the above-discussed drawbacks.

According to the invention, the locking device includes at least one holding portion having an outer contour, and a locking contour corresponding thereto, and the locking contour includes at least one stationary first member and at least one second member configured to be moved, preferably pivotally, relative to the first member, wherein the at least one holding portion is received between the two members of the locking contour in a locked position.

In other words, the locking contour has at least a two-part configuration and includes a stationary first member and at least one second member configured to be moved relative to the first member, and the first member and second member of the locking contour embrace the fixable holding portion in the locked position. Accordingly, the holding portion is held in the locked position by the first member and second member of the locking contour both in a force-locking and also in a form-locking manner.

This has the particular advantage that the holding portion, upon an actuation of the movable second member of the locking contour, will be further held in position by the stationary member of the locking contour in a form-locking manner, without the holding portion performing a relative movement to the first member of the locking contour. Only after an intentionally performed release movement, the components configured to be locked to one another (that is to say the mounting body and the holding portion of a fitting portion) can be separated from one another. This constitutes a safety aspect, because the danger of an unintentional loosening of the locking device and a crash of the furniture part can be significantly reduced.

According to a preferred embodiment of the invention, both members of the locking contour are arranged on the mounting body, and the at least one holding portion is arranged on that fitting portion, that is to be locked, of the furniture hinge.

The outer contour of the at least one holding portion can be configured at least partially cylindrical, for example as a cylindrical pin. The fitting portion, that is to be locked, of the furniture hinge can include at least two side limbs mutually spaced from one another in a parallel relationship, and the cylindrical pin is arranged between the two side limbs of the fitting portion.

The at least one stationary first member of the locking contour can be formed, for example, on a hook element. It can be preferably provided that the first member of the locking contour is configured to be open in a direction of the fitting portion which is connected via the at least one hinge axis to the fitting portion to be locked.

The at least one stationary first member of the locking contour, in a cross-section, can have a concave, preferably a semi-cylindrical, portion.

According to an embodiment of the invention, the two members of the locking contour, in a cross-section, collectively form a three-quarter circle, and/or are laterally arranged offset to one another in a direction extending parallel to the at least one hinge axis. In this way, a stable and very tilting-proof connection between the mounting body and the holding portion can be afforded.

The locking contour can include at least two stationary first members which are spaced from one another in a direction extending parallel to the at least one hinge axis, and the at least one second member of the locking contour is arranged between the at least two stationary first members.

According to a preferred embodiment, the at least one second member of the locking contour is formed on a lever. Thereby, an end of the lever is pivotally supported about a pivoting axis, and/or a spring element, preferably a leg spring or a leaf spring, is provided, the spring element pressurizing the lever with a force in a direction of the locked position, and/or the lever has a free end, and the second member of the locking contour is arranged on the free end of the lever, and/or the lever has a free end, and an actuating element for manually unlocking the locking device is arranged on the free end of the lever.

BRIEF DESCRIPTION OF THE DRAWINGS

Further details and advantages of the present invention result from the following description of figures, in which.

DETAILED DESCRIPTION OF THE INVENTION

Figure 1A:
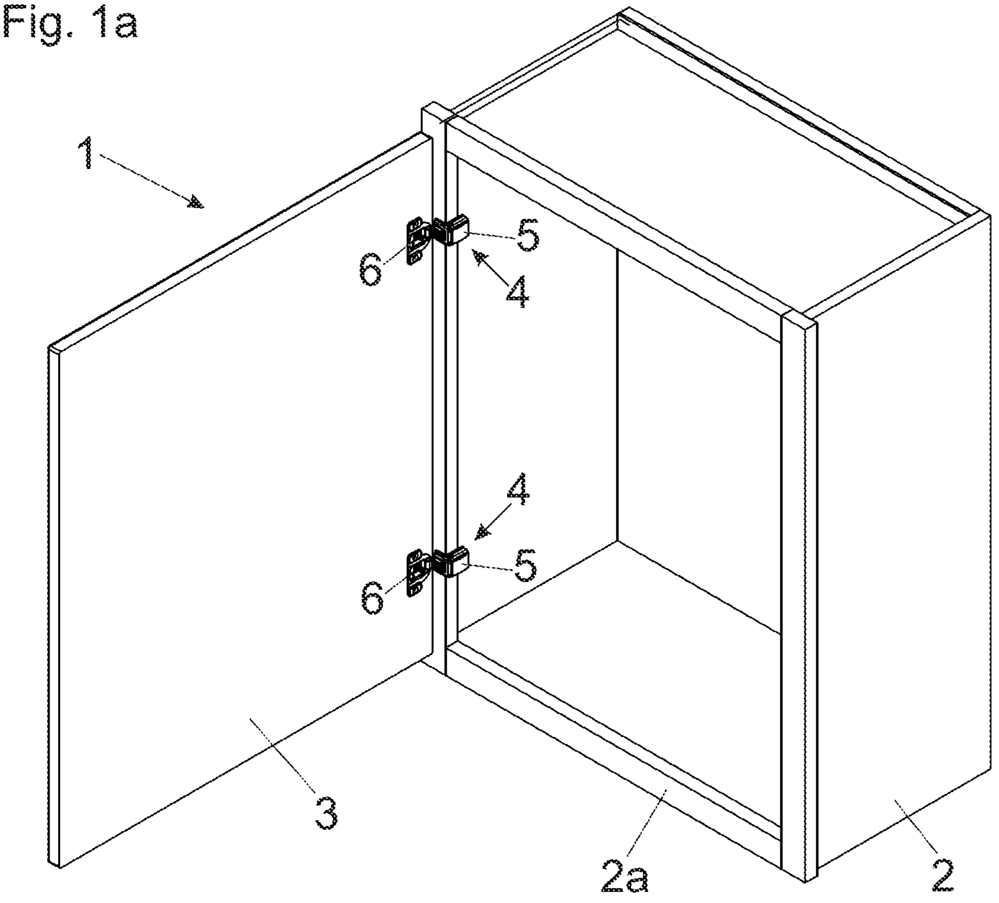
FIG. 1*a*, 1*b* are perspective views of an item of furniture comprising a furniture carcass and a furniture part movably-supported relative to the furniture carcass, and a perspective view of a furniture hinge for movably supporting the furniture part.

FIG. 1*a* shows a perspective view of an item of furniture 1 comprising a furniture carcass 2 and a furniture part 3, the furniture part 3 being pivotally supported relative to the furniture carcass 2 by two or more furniture hinges 4. The furniture hinges 4 include two fitting portions 5, 6 hingedly connected to one another. A first fitting portion 5 of the furniture hinge 4 is configured to be fixed to the furniture carcass 2, and a second fitting portion 6 of the furniture hinge 4 is configured to be fixed to the movable furniture part 3.

In the shown embodiment, the furniture hinges 4 are configured as so-called frame hinges. The first fitting portion 5 of the furniture hinge 4 can be configured as an angled hinge arm 5*a* (FIG. 1*b*), the hinge arm 5*a* being configured to be fixed to a frame 2*a* of the furniture carcass 2.

Figure 1B:
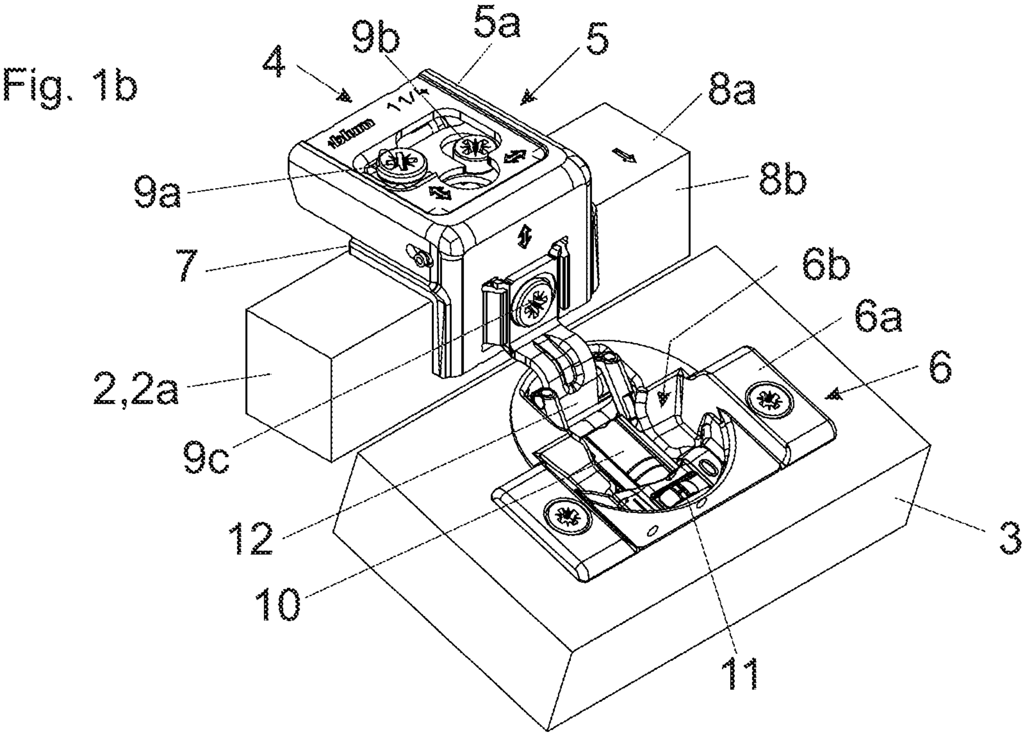

FIG. 1*b* shows the furniture hinge 4 in a mounted condition on the frame 2*a* of the furniture carcass 2. The first fitting portion 5 in the form of the hinge arm 5*a* is configured substantially L-shaped, and a first limb of the L-shaped hinge arm 5*a* is configured to bear against a narrow side 8*a* of the frame 2*a*. A second limb of the L-shaped hinge arm 5*a* is configured to bear against a side surface 8*b* of the frame 2*a*.

The first fitting portion 5 in the form of the hinge arm 5*a* can be fixed to the furniture carcass 2 via a mounting body 7. In a first mounting step, the mounting body 7 is to be fixed to the furniture carcass 2, preferably to the frame 2*a*. In a subsequent mounting step, the first fitting portion 5 can be locked with the mounting body 7 which is pre-mounted to the furniture carcass 2 without the use of a tool, and can be unlocked without the use of a tool.

By at least one or more adjustment devices 9*a*, 9*b*, 9*c*, a position of the furniture part 3 can be adjusted in a mounted condition on the furniture carcass 2. It can be preferably provided that three adjustment devices 9*a*, 9*b*, 9*c* are provided so as to adjust a position of the furniture part 3 relative to the furniture carcass 2 in a three-dimensional manner. By the first adjustment device 9*a*, the movable furniture part 3 is adjustable in a depth direction. By the second adjustment device 9*b*, the movable furniture part 3 is adjustable in a height direction. By the third adjustment device 9*c*, a side adjustment of the movable furniture part 3 can be afforded. At least one adjustment device 9*a*, 9*b*, 9*c*, preferably all adjustment devices 9*a*, 9*b*, 9*c*, includes or include a rotationally supported adjustment wheel (for example an eccentric, a spiral disc or an adjustment screw).

The second fitting portion 6 of the furniture hinge 4 can be configured as a hinge cup 6*a*, the hinge cup 6*a* being pivotally connected to the first fitting portion 5 via at least one hinge axis 14 (FIG. 2), preferably precisely one single hinge axis 14. The hinge cup 6*a* includes a cavity 6*b* in which a damping device 10 is arranged, the damping device 10 being configured to dampen a relative movement of the two fitting portions 5, 6 of the furniture hinge 4 to one another. The damping device 10 can include at least one, preferably hydraulic, piston-cylinder-unit, the piston-cylinder-unit being configured to be acted upon by a pivotable hinge lever 12 of the furniture hinge 4 upon a predetermined relative position of the fitting portions 5, 6 to one another. By a movably supported switch 11 having at least two switching positions, a damping power of the damping device 10 can be limited or deactivated.

Figure 2:
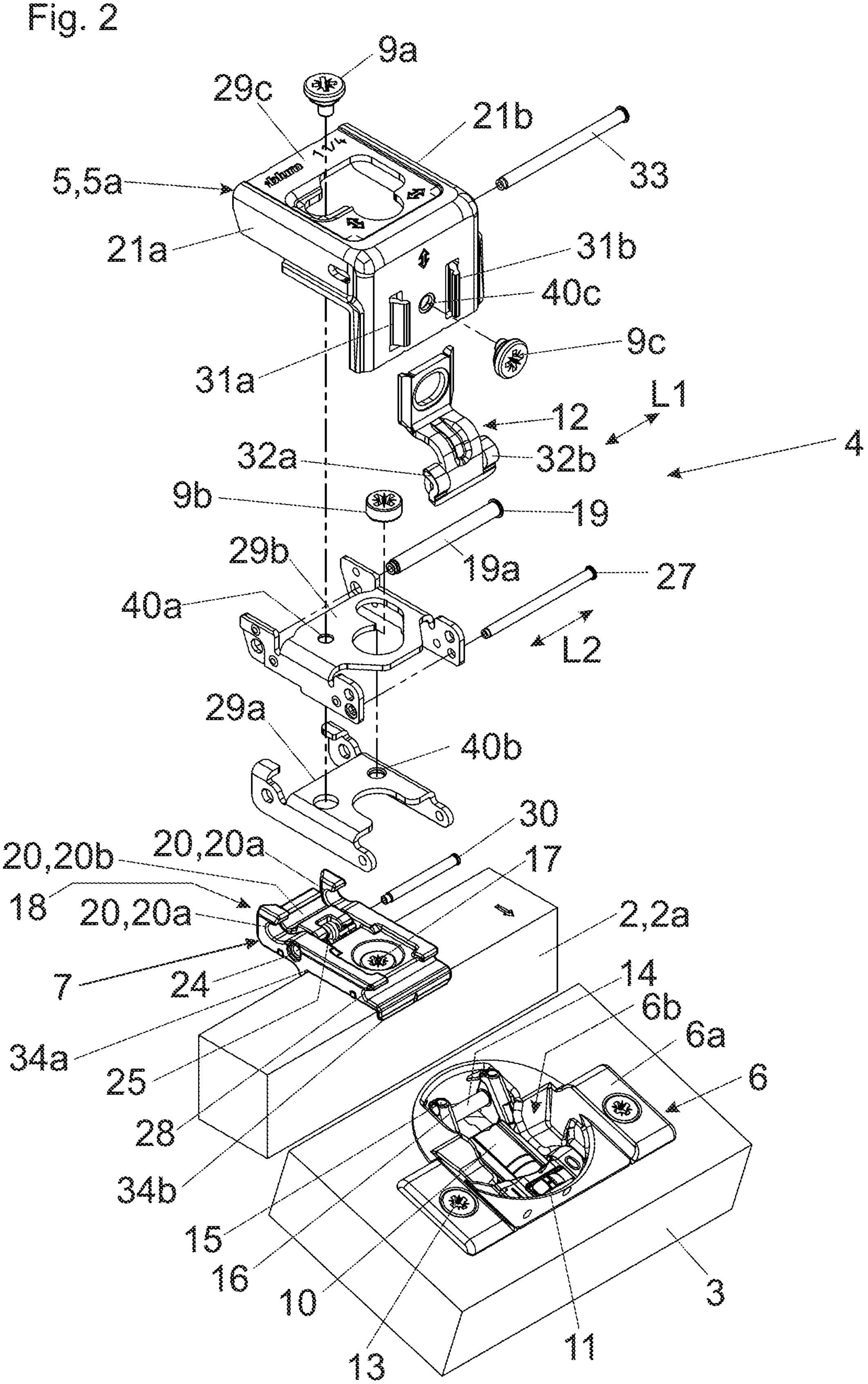
FIG. 2 shows a furniture hinge configured to be fixed to the mounting body in an exploded view.

FIG. 2 shows the furniture hinge 4 according to FIG. 1*b*, the furniture hinge 4 being configured to be releasably locked to the mounting body 7 which is to be fixed to the furniture carcass 2. The second fitting portion 6 of the furniture hinge 4 can be configured as a hinge cup 6*a*. The hinge cup 6*a* can be countersunk within a bore of the movable furniture part 3, and the hinge cup 6*a* can be fixed to the movable furniture part 3 by at least one fastener 13 (for example by a screw or by at least one expanding member).

A damping device 10 for dampening a movement of the furniture hinge 4 is arranged within the cavity 6*b* of the hinge cup 6*a*. The second fitting portion 6 is pivotally connected to the first fitting portion 5 via at least one, preferably precisely one single, hinge axis 14.

The furniture hinge 4 includes a spring device 15 for moving the second fitting portion 6 into a closed-end position and/or into an open-end position relative to the first fitting portion 5. In the shown embodiment, the spring device 15 is configured as a leg spring, and each of the two ends of the leg spring have a plastic coating 16. In an assembled condition of the furniture hinge 4, each of the plastic coatings 16 bears against a control curve 32*a*, 32*b* of the first fitting portion 5. Therefore, the frictional resistance can be reduced and the fitting portions 5, 6 can be moved smoothly and practically without noise emissions relative to one another.

The mounting body 7 can be fixed, for example, via at least one screw 17 to the furniture carcass 2, preferably to the frame 2*a*. The mounting body 7 includes at least two protrusions 34*a*, 34*b* configured to bear against opposing sides of the frame 2*a* in order to improve the pre-positioning of the mounting body 7.

By a locking device 18, the first fitting portion 5 can be releasably locked with the mounting body 7. The locking device 18 includes at least one holding portion 19 having a, preferably cylindrical, outer contour 19*a*, and a locking contour 20 corresponding to the outer contour 19*a*. The locking contour 20 includes at least one first stationary member 20*a*, and at least one second member 20*b* configured to be moved, preferably pivotally, relative to the first member 20*a*. In the locked position, the at least one holding portion 19 is received between the two members 20*a*, 20*b* of the locking contour 20.

In a simple manner, the at least one holding portion 19 can be configured as a cylindrical pin. The first fitting portion 5 to be locked can include two side limbs 21*a*, 21*b* mutually spaced from one another, and the cylindrical pin is arranged therebetween.

The movable second member 20*b* of the locking contour 20 is pre-stressed by a spring element 25, preferably by a leg spring or by a leaf spring, and the spring element 25 pressurizes the second member 20*b* of the locking contour 20 with a force in a direction of the locked position. The movable second member 20*b* of the locking contour 20 is pivotally supported about a pin 30, the pin 30 forming the pivot axis 24 for the movable second member 20*b* of the locking contour 20.

The two fitting portions 5, 6 of the furniture hinge 4 can be connected to one another via at least one hinge lever 12 separate from the two fitting portions 5, 6. By the adjustment device 9*c*, a position of the at least one hinge lever 12 relative to the fitting portion 5, 6 configured to be locked to the mounting body 7 is adjustable, in the present case adjustable relative to the hinge arm 5*a*. For this purpose, the first fitting portion 5 can include at least one linear guide 31*a*, 31*b* for adjustably supporting the hinge lever 12.

The first fitting portion 5 to be locked with the mounting body 7 of the furniture hinge 4 can include at least two, and preferably precisely three, plates 29*a*, 29*b*, 29*c* arranged above one another. By at least one adjustment device 9*a*, 9*b*, 9*c*, the at least two plates 29*a*, 29*b*, 29*c* can be displaced relative to one another and/or can be pivoted relative to one another. For the linear adjustment of the plates 29*a*, 29*b*, 29*c* to one another, at least two pin-shaped holding parts 19, 27, 33 can be provided, and the at least two plates 29*a*, 29*b*, 29*c* can be linearly displaced relative to one another along the at least two pin-shaped holding parts 19, 27, 33.

In the shown embodiment, each of the adjustment devices 9*a*, 9*b*, 9*c* includes an eccentric. The eccentric of the first adjustment device 9*a* is rotationally connected (preferably clinched) to the second plate 29*b* via the bearing location 40*a*, and the eccentrical control curve of the eccentric is supported on the third plate 29*c*.

The eccentric of the second adjustment device 9*b* is rotationally connected (preferably clinched) to the first plate 29*a* via the bearing location 40*b*, and the eccentrical control curve of the eccentric is supported on the second plate 29*b*.

The eccentric of the third adjustment device 9*c* is rotationally connected (preferably clinched) to the third plate 29*c* via the bearing location 40*c*, and the eccentrical control curve of the eccentric is supported on the hinge lever 12.

Of course, it is also possible that the adjustment devices 9*a*, 9*b*, 9*c* can include a worm gear or a rotatable spiral disc instead of the eccentric, the spiral disc being configured to co-operate with mutually spaced protrusions of the component to be adjusted.

Figure 3:
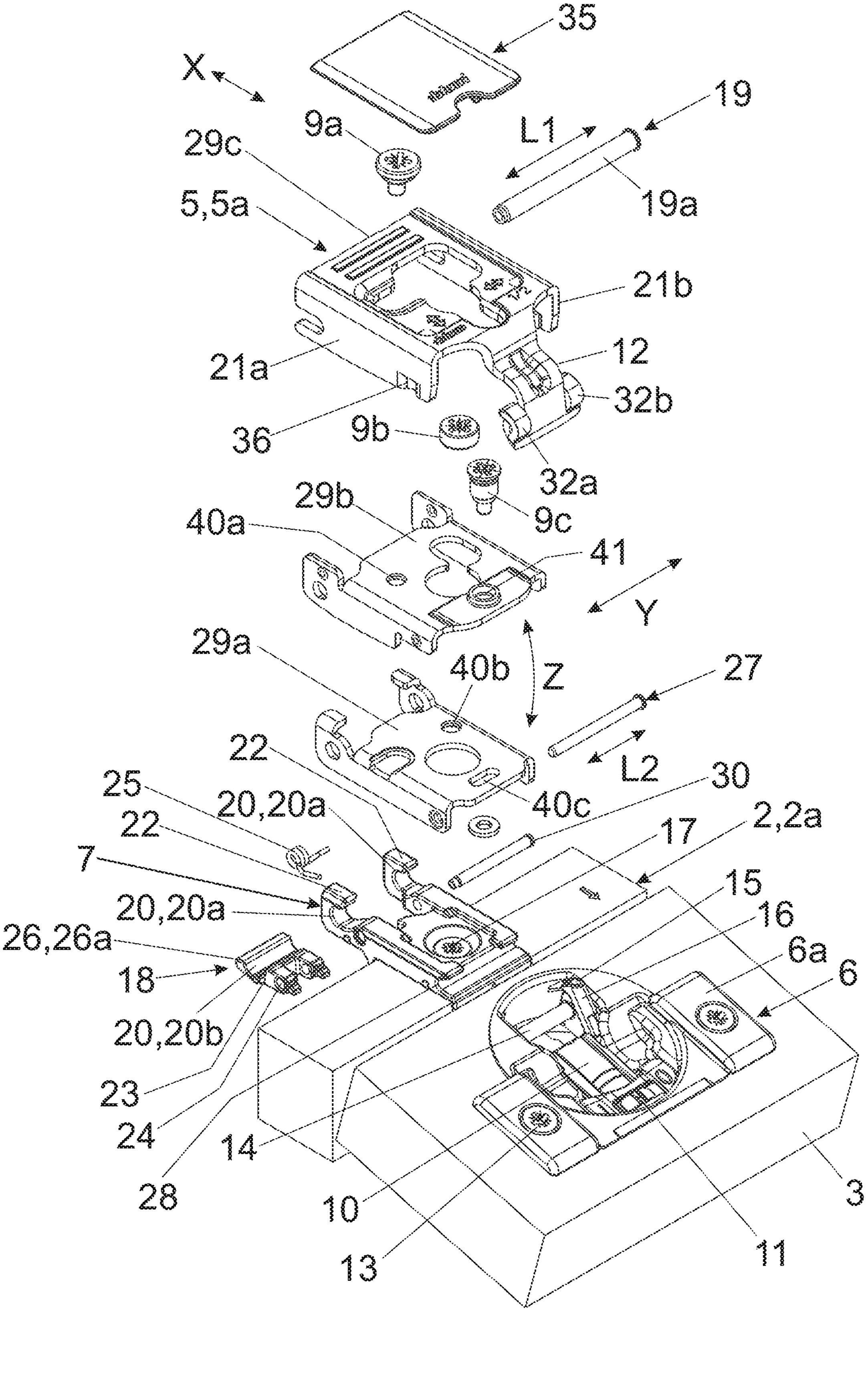
FIG. 3 shows a further embodiment of a furniture hinge in an exploded view.

FIG. 3 shows a slightly modified furniture hinge 4 in an exploded view. In contrast to the furniture hinge 4 according to FIG. 2, the hinge lever 12 and the plate 29*c* of the first fitting portion 5 are formed together so as to have an integral one-piece configuration. By a, preferably rectangular, cover 35, at least one adjustment wheel, preferably at least two adjustment wheels, of the adjustment devices 9*a*, 9*b*, 9*c* can be covered.

The locking device 18 can include at least one further holding portion 27, and the two holding portions 19, 27 of the locking device 18 are mutually spaced from one another in a direction extending transversely to the at least one hinge axis 14, It can be preferably provided that

- each of the two holding portions 19, 27 of the locking device 18 has a longitudinal direction L1, L2, and the longitudinal directions L1, L2 of the two holding portions 19, 27 extend substantially parallel to one another, and/or
- the at least one further holding portion 27 is configured as a cylindrical pin, preferably wherein the lockable fitting portion 5, 6 of the furniture hinge 4 includes at least two mutually spaced side limbs 21*a*, 21*b* between which the cylindrical pin is arranged.

The at least one stationary first member 20*a* of the locking contour 20 can be formed on a hook element 22. It can be preferably provided that the first member 20*a* of the locking contour 20 is configured to be open in a direction of the fitting portion 6 that is connected to the lockable fitting portion 5 via the at least one hinge axis 14. It can be seen that the at least one first stationary member 20*a* of the locking contour 20, in a cross-section, has a concave, preferably approximately a semi-cylindrical, portion.

In the shown embodiment, the locking contour 20 includes at least two stationary first members 20*a* which are mutually spaced from one another in a direction extending parallel to the at least one hinge axis 14. The at least one second member 20*b* of the locking contour is arranged between the at least two stationary first members 20*a* of the locking contour 20.

The at least one second member 20*b* of the locking contour 20 can be arranged on a lever 23. It can be preferably provided

- that an end of the lever 23 is pivotally supported about a pivoting axis 24, and/or
- that a spring element 25, preferably a leg spring or a leaf spring, is provided, the spring element 25 pressurizing the lever 23 with a force in a direction of the locked position, and/or
- that the lever 23 has a free end 26, and the second member 20*b* of the locking contour is arranged on the free end 26 of the lever 23, and/or
- that the lever 23 has a free end 26, and an actuating element 26*a* for manually unlocking the locking device 18 is arranged on the free end 26 of the lever 23.

The second plate 29*b* can be slid from the rear, that is to say in the direction (X), between the side limbs 21*a*, 21*b* of the third plate 29*c*. The third plate 29*c* includes an inwardly projecting abutment 36, preferably in the form of an embossment, configured to limit a movement of the second plate 29*b*. The eccentric of the first adjustment device 9*a* is rotationally connected to the second plate 29*b* via the bearing location 40*a*. By an actuation of the first adjustment device 9*a*, the third plate 29*c* relative to the second plate 29*b* can be adjusted in the direction (X).

The eccentric of the second adjustment device 9*b* is rotationally connected to the first plate 29*a* via the bearing location 40*b*. By an actuation of the second adjustment device 9*b*, the plates 29*b*, 29*c* are jointly adjustable relative to the first plate 29*a* in direction (Y).

In the shown embodiment, the third adjustment device 9*c* includes an adjustment screw, and a lower end of the adjustment screw is supported on the bearing location 40*c* of the first plate 29*a*. The adjustment screw of the third adjustment device 9*c* has an outer thread configured to co-operate with an inner thread 41 of the second plate 29*b*. By an actuation of the third adjustment device 9*c*, the second plate 29*b* can be pivoted relative to the first plate 29*a* about the pin-shaped holding portion 19 in the direction (Z).

The two stationary first members 20*a* of the locking contour 20 are each formed on a hook element 22, and the movable second member 20*b* of the locking contour 20 is arranged between the two first members 20*a* of the locking contour 20. The movable second member 20*b* is pivotally supported about the pin 30, the pin 30 forming the pivot axis 24 for the second member 20*b*. It can be preferably provided that the direction of the at least one hinge axis 14 and the direction of the pivot axis 24 extend parallel to one another.

It is to be noted that the screw 17, by which the mounting body 7 is fixed to the furniture carcass 2, can be actuated at any time by a tool, preferably by a screwdriver, in an assembled and in a mounted condition of the furniture hinge 4 on the furniture carcass 2. For this purpose, the recesses in the plates 29*a*, 29*b*, 29*c* have to be arranged such that an introduction of the tool and a rotational movement of the screw 17 with the aid of the tool can be possible in all operating positions of the furniture hinge 4.

FIG. 4*a*-4*d* shows the mounting operation of the first fitting portion 5 of the furniture hinge 4 to the mounting body 7. In a first mounting step, the mounting body 7 is to be fixed to the furniture carcass 2, in particular to the frame 2*a* of the furniture carcass 2, via the screw 17. By means of the protrusions 34*a*, 34*b*, an improved pre-positioning of the mounting body 7 relative to the frame 2*a* of the furniture carcass 2 can be provided.

The first fitting portion 5 includes the two mutually spaced holding portions 19, 27 which, in the shown embodiment, have a cylindrical outer contour. The two holding portions 19, 27 are mutually spaced from one another in a direction extending transversely to the at least one hinge axis 14 and each have a longitudinal direction L1, L2 extending substantially parallel to one another.

The mounting body 7 is provided with the locking contour 20 comprising the two stationary first members 20*a* and the movable second member 20*b*. The second member 20*b* is movably supported between the two stationary first members 20*a*. The locking contour 20 of the mounting body 7 is configured to be releasably locked with the holding portion 19 of the first fitting portion 5. The mounting body 7 further includes a receiving device 28 configured to receive the further holding portion 27 of the first fitting portion 5.

Figure 4A:
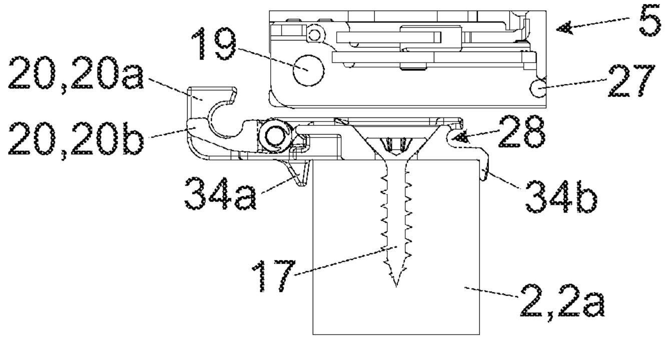
FIG. 4*a*-4*d* show the mounting operation of the first fitting portion to the mounting body in cross-sectional views.
Figure 4B:
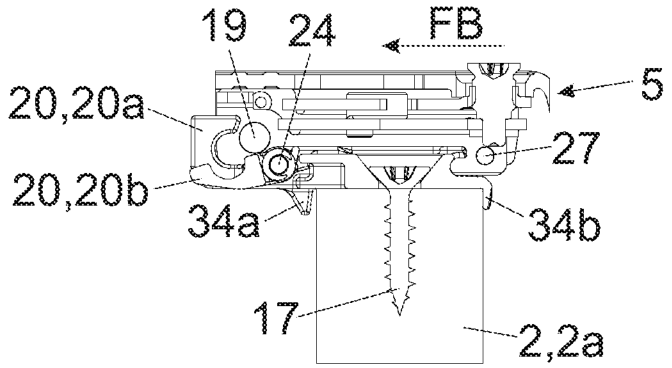

Starting from the position according to FIG. 4*a*, the fitting portion 5 is placed onto the mounting body 7 and is moved in a direction of the assembly movement (FB). By the movement of the fitting portion 5 in the direction of the assembly movement (FB), the second member 20*b* of the locking contour 20 is moved about the pivot axis 24 against a force of the spring element 25 (FIG. 4*b*).

Figure 4C:
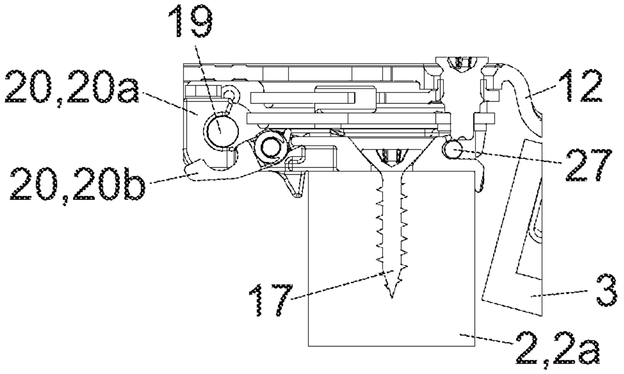
Figure 4D:
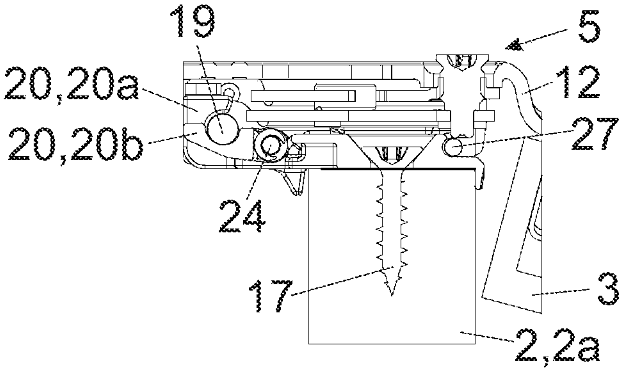

The two holding portions 19, 27 can be arranged within the locking contour 20 and within the at least one receiving device 28 by a single common, preferably translational, assembly movement (FB, see FIG. 4*c*). By a continued movement of the first fitting portion 5 in the direction of the assembly movement (FB), the second member 20*b* of the locking contour 20 snaps back by a force of the spring element 25 so as to lock the holding portion 19 in a force-locking and in a form-locking manner. The two members 20*a*, 20*b* of the locking contour 20, in a cross-section, collectively form a three-quarter circle and/or are arranged offset to one another in a direction extending parallel to the at least one hinge axis 14.

The locking between the mounting body 7 and the first fitting portion 5 can be again released by applying a force to the second member 20*b* of the locking contour 20, against a force of the spring element 25. As shown in a comparison of FIGS. 4*b* and 4*c*, the force is applied to pivot the second member 20*b* in a downward direction (toward the mounting portion 7 and the furniture carcass 2) about pivot axis 24 to release the first fitting portion 5 from the mounting body 7. The application of force to the second member 20*b* for releasing the locking can be done, for example manually, that is to say without the use of a tool. Alternatively, a tool may also be used for applying a force to the second member 20*b* so as to release the locking between the mounting body 7 and the fitting portion 5.

Figure 5A:
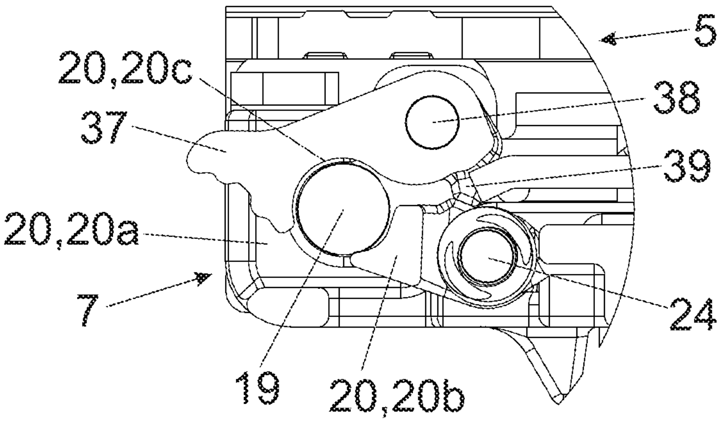
FIG. 5*a*-5*c* show a further embodiment with an additional unlocking lever for releasing the connection between the mounting body and the holding portion.
Figure 5B:
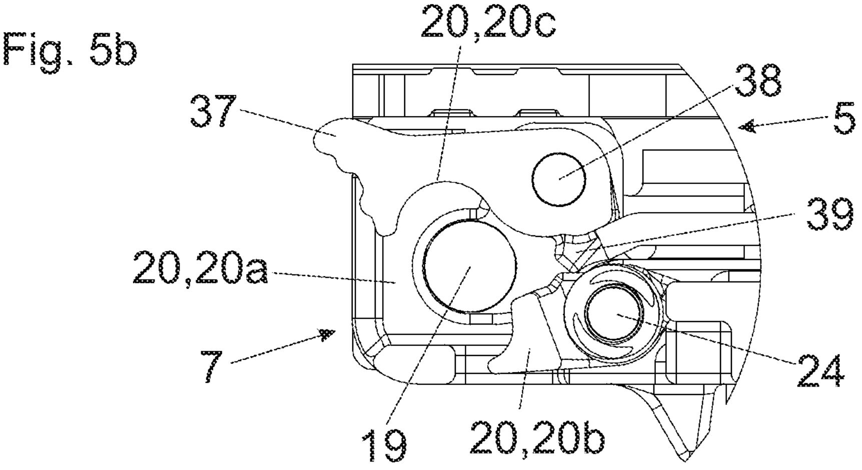
Figure 5C:
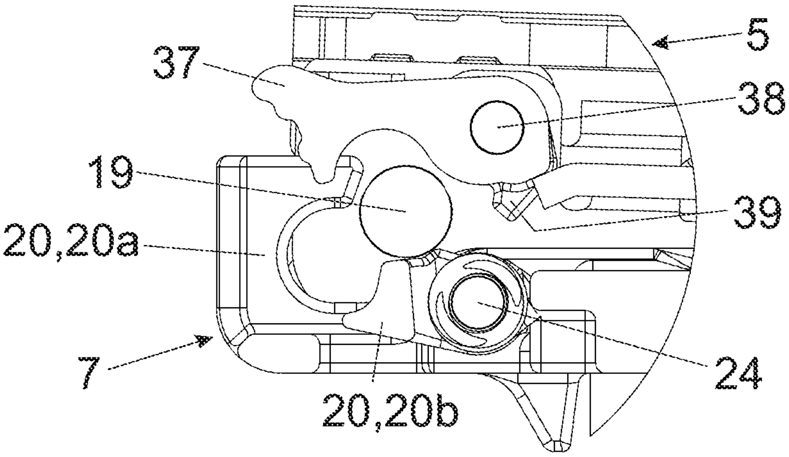

FIG. 5*a*-5*c* show the locked condition between the mounting body 7 and the fitting portion 5. The locking device 18 includes an additional unlocking lever 37 for releasing the locking between the mounting body 7 and the fitting portion 5 of the furniture hinge 4.

In the shown embodiment, the locking device 18 includes a third locking contour 20*c*, the third locking contour 20*c* being arranged on the unlocking lever 37 and being at least partially adapted to an outer contour 19*a* of the holding portion 19. In the shown embodiment, the third locking contour 20*c* has a substantially semi-cylindrical form.

The unlocking lever 37 is configured as a component separate from the second member 20*b* of the locking contour 20, and the unlocking lever 37 is immediately and directly accessible for a manual actuation or for a tool-assisted actuation.

The unlocking lever 37 can be pivoted about the pivoting axis 38 by a manual lifting movement, whereby the third locking contour 20*c* of the locking contour 20 can be disengaged from the holding portion 19 (FIG. 5*b*).

The unlocking lever 37 is coupled to the second member 20*b* of the locking contour 20 via at least one coupling device 39 such that the at least one unlocking lever 37 and the second member 20*b* of the locking contour 20 can be pivoted in opposing pivoting directions.

In the shown embodiment, the coupling device 39 is formed by a protrusion arranged on the unlocking lever 37, the protrusion bearing loosely against the second member 20*b* of the locking contour 20 in a locked position between the mounting body 7 and the fitting portion (FIG. 5*a*). Upon a movement of the unlocking lever 37 about the pivoting axis 38, the protrusion of the coupling device 39 pushes against the second member 20*b* of the locking contour 20, so that the second member 20*b* can be pivoted in an opposite pivoting direction about the pivoting axis 24 so as to unblock the holding portion 19.

FIG. 5*c* shows the unlocked condition between the mounting body 7 and the fitting portion 5. In the shown embodiment, the unlocking lever 37 is movably arranged on the fitting portion 5. It can be preferably provided that the pivoting axis 38 of the unlocking lever 37 and the at least one hinge axis 14 of the furniture hinge 4 extend parallel to one another.

The invention claimed is:

1. A hinge assembly comprising:

- a mounting body configured to be fixed to a furniture carcass;
- a furniture hinge comprising a first fitting portion and a second fitting portion connected to one another via a hinge axis;
- a locking device configured to lock the first fitting portion to the mounting body, the locking device including:
  - a holding portion having an outer contour, and
  - a locking contour corresponding thereto,
  - wherein the locking contour includes a stationary first member and a movable second member configured to be moved relative to the first member, the holding portion being received between the first member and the second member of the locking contour in a locked position, and
- an unlocking lever configured to unlock the locking device, the unlocking lever being configured to:
  - be a component separate from the second member of the locking contour, and/or
  - immediately and directly be accessible for a manual actuation or for a tool-assisted actuation, and/or
  - be coupled to the second member of the locking contour via a coupling device such that the unlocking lever and the second member of the locking contour are pivotable in opposing pivoting directions.

2. The hinge assembly according to claim 1, wherein the first member and the second member of the locking contour are arranged on the mounting body, and the holding portion is arranged on the first fitting portion of the furniture hinge.

3. The hinge assembly according to claim 1, wherein the outer contour of the holding portion is at least partially cylindrical.

4. The hinge assembly according to claim 3, wherein the holding portion is a cylindrical pin.

5. The hinge assembly according to claim 4, wherein the first fitting portion of the furniture hinge includes at least two mutually spaced side limbs between which the cylindrical pin is arranged.

6. The hinge assembly according to claim 1, wherein the first stationary member of the locking contour is formed on a hook element.

7. The hinge assembly according to claim 6, wherein the first member of the locking contour is configured to be open in a direction of the fitting portion connected to the first fitting portion via the hinge axis.

8. The hinge assembly according to claim 1, wherein the stationary first member of the locking contour, in a cross-section, includes a concave, semi-cylindrical portion.

9. The hinge assembly according to claim 1, wherein the first member and the second member of the locking contour, in a cross-section, collectively form a three-quarter circle, and/or are arranged offset to one another in a direction extending parallel to the hinge axis.

10. The hinge assembly according to claim 1, wherein the stationary first member of the locking contour is a first one of at least two stationary first members spaced apart from one another in a direction extending parallel to the hinge axis, the second member of the locking contour being arranged between the at least two stationary first members.

11. The hinge assembly according to claim 1, wherein the second member of the locking contour is arranged on a lever.

12. The hinge assembly according to claim 11, wherein the locking device is configured:

such that an end of the lever is pivotally supported about a pivoting axis, and/or to include a spring element in the form of a leg spring or a leaf spring, the spring element being configured to pressurize the lever with a force in a direction of the locked position, and/or such that the lever has a free end, and the second member of the locking contour is arranged on the free end of the lever, and/or such that the lever has a free end, and an actuating element for manually unlocking the locking device is arranged on the free end of the lever.

13. The hinge assembly according to claim 1, wherein the holding portion is a first holding portion, the locking device including a second holding portion, wherein the first holding portion and the second holding portion of the locking device are spaced apart from one another in a direction extending transversely to the hinge axis.

14. The hinge assembly according to claim 13, wherein:

each of the first holding portion and the second holding portion of the locking device has a longitudinal direction extending substantially parallel to one another, and/or the second holding portion is a cylindrical pin, and the first fitting portion of the furniture hinge includes at least two spaced apart side limbs between which the cylindrical pin is arranged.

15. The hinge assembly according claim 1, wherein the holding portion is a first holding portion, the locking device further including a second holding portion and a receiving device in which the second holding portion can be arranged.

16. The hinge assembly according claim 15, wherein:

the receiving device is configured to be open in a direction of the second fitting portion, and/or the first holding portion and the second holding portion of the locking device are each receivable within a respective one of the locking contour and the receiving device by a single common, translational, assembly movement.

17. The hinge assembly according to claim 1, wherein the first fitting portion to be locked to the mounting body includes at least two plates stacked one above another.

18. The hinge assembly according to claim 17, wherein:

the hinge assembly further comprises an adjustment device configured to move the at least two plates relative to one another, and/or the holding portion being a first pin-shaped plate holding portion, the hinge assembly further comprising a second pin-shaped plate holding portion along which the at least two plates are linearly displaceable relative to one another.

19. The hinge assembly according to claim 1, wherein the first fitting portion and the second fitting portion are connected to one another by a hinge lever separate from both of the first fitting portion and the second fitting portion.

20. The hinge assembly according to claim 19, further comprising an adjustment device configured to adjust a position of the hinge lever relative to the first fitting portion.

21. The hinge assembly according to claim 1, wherein the second fitting portion is a hinge cup, the hinge assembly further comprising a damping device for dampening a relative movement between the first fitting portion and the second fitting portion, the damping device being arranged within the hinge cup, and a damping power of the damping device is adjustable by a switch.

22. The hinge assembly according to claim 1, wherein the first fitting portion is connected to the second fitting portion by precisely one hinge axis, the locking device is configured to releasably lock the first fitting portion to the mounting body, and the second member is configured to be moved pivotally relative to the first member.

23. A hinge assembly comprising:

a mounting body configured to be fixed to a furniture carcass;

a furniture hinge comprising a first fitting portion and a second fitting portion connected to one another via a hinge axis; and a locking device configured to releasably lock the first fitting portion to the mounting body, the locking device including:

a holding portion having an outer contour, and a locking contour corresponding thereto, wherein the locking contour includes a stationary first member and a movable second member configured to be moved relative to the first member, the holding portion being received between the first member and the second member of the locking contour in a locked position, and wherein the second member is configured to be pivoted downward about a pivot pin to release the lock between the first fitting portion and the mounting body.

24. The hinge assembly according to claim 23, wherein the movable second member has a first end attached to the mounting body via the pivot pin, and has a second free end to which a force is to be applied to pivot the second member about the pivot pin, the second free end being located between the stationary first member and the pivot pin.

* * * * *